(12) United States Patent
Kawamura

(10) Patent No.: US 7,216,239 B2
(45) Date of Patent: May 8, 2007

(54) COUNTERFEIT DETECTING PROGRAM, METHOD, AND APPARATUS OF DIGITAL DATA

(75) Inventor: Katsuhiko Kawamura, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 757 days.

(21) Appl. No.: 10/188,992

(22) Filed: Jul. 5, 2002

(65) Prior Publication Data
US 2003/0037256 A1   Feb. 20, 2003

(30) Foreign Application Priority Data
Aug. 14, 2001   (JP)   ............... 2001-246256

(51) Int. Cl.
*G06F 11/22*   (2006.01)
(52) U.S. Cl. ..................................... 713/187
(58) Field of Classification Search ........ 713/187–188; 726/26; 714/54; 711/163
See application file for complete search history.

(56) References Cited

U.S. PATENT DOCUMENTS

| | | | |
|---|---|---|---|
| 5,748,886 A | * | 5/1998 | Hijii .............. 714/49 |
| 6,611,931 B1 | * | 8/2003 | Sumida ............. 714/719 |
| 6,633,999 B1 | * | 10/2003 | Lee ................. 714/30 |
| 6,681,329 B1 | * | 1/2004 | Fetkovich et al. ...... 713/189 |

FOREIGN PATENT DOCUMENTS

| | | |
|---|---|---|
| JP | 5-12134 | 1/1993 |
| JP | 8-137762 | 5/1996 |
| JP | 11-39156 A | 2/1999 |
| JP | 11-39897 | 2/1999 |
| JP | 11-96082 | 4/1999 |

\* cited by examiner

*Primary Examiner*—Emmanuel L. Moise
*Assistant Examiner*—David Pearson
(74) *Attorney, Agent, or Firm*—Foley & Lardner LLP

(57) ABSTRACT

In digital data counterfeit detecting program, apparatus, and method, an address arithmetic processing is performed for a value of one of a plurality of digital data which is stored in each of addresses, a result of the address arithmetic processing performed for the value of the one of the digital data representing one of the addresses and a predetermined arithmetic processing is executed for the value stored in each of the addresses which are the respective results of the address arithmetic processing to calculate a collation value used for a digital data counterfeit detection.

37 Claims, 9 Drawing Sheets

FIG.3

| ADDRESS | 1 | 2 | 3 | 4 | 5 | 6 | 7 | 8 | 9 | 10 |
|---------|---|---|---|---|---|---|---|---|---|----|
| DATA    | 5 | 7 | 2 | 1 | 7 | 5 | 10 | 5 | 3 | 4 |

FIG.4

| ADR1 | 1 | 2 | 3 | 4 | 5 | 6 | 7 | 8 | 9 | 10 |
|---|---|---|---|---|---|---|---|---|---|---|
| Data1 | 5 | 7 | 2 | 1 | 7 | 5 | 10 | 5 | 3 | 4 |
| ADR2 | 5 | 7 | 2 | 1 | 7 | 5 | 10 | 5 | 3 | 4 |
| Data2 | 7 | 10 | 7 | 5 | 10 | 7 | 4 | 7 | 2 | 1 |
| COLLATION VALUE | 7 | 17 | 24 | 29 | 39 | 46 | 50 | 57 | 59 | 60 |

FIG.5

| ADDRESS | 1 | 2 | 3 | 4 | 5 | 6 | 7 | 8 | 9 | 10 |
|---|---|---|---|---|---|---|---|---|---|---|
| DATA | 5 | 7 | 2 | 1 | 7→6 | 5 | 10 | 5 | 3 | 4 |

FIG.6

| ADR1 | 1 | 2 | 3 | 4 | 5 | 6 | 7 | 8 | 9 | 10 |
|---|---|---|---|---|---|---|---|---|---|---|
| Data1 | 5 | 7 | 2 | 1 | 6 | 5 | 10 | 5 | 3 | 4 |
| ADR2 | 5 | 7 | 2 | 1 | 6 | 5 | 10 | 5 | 3 | 4 |
| Data2 | 6 | 10 | 7 | 5 | 5 | 6 | 4 | 6 | 2 | 1 |
| COLLATION VALUE | 6 | 16 | 23 | 28 | 33 | 39 | 43 | 49 | 51 | 52 |

FIG.7

| ADR1 | 1 | 2 | 3 | 4 | 5 | 6 | 7 | 8 | 9 | 10 |
|---|---|---|---|---|---|---|---|---|---|---|
| Data1 | 5 | 7 | 2 | 1 | 7 | 5 | 10 | 5 | 3 | 4 |
| ADR2 | 6 | 9 | 5 | 5 | 2 | 1 | 7 | 3 | 2 | 4 |
| Data2 | 5 | 3 | 7 | 7 | 7 | 5 | 10 | 2 | 7 | 1 |
| COLLATION VALUE | 5 | 8 | 15 | 22 | 29 | 34 | 44 | 46 | 53 | 54 |

FIG.8

| ADR1 | 1 | 2 | 3 | 4 | 5 | 6 | 7 | 8 | 9 | 10 |
|---|---|---|---|---|---|---|---|---|---|---|
| Data1 | 5,7 | 7,2 | 2,1 | 1,7 | 7,5 | 5,10 | 10,5 | 5,3 | 3,4 | 4,5 |
| ADR2 | 2 | 9 | 3 | 8 | 2 | 5 | 5 | 8 | 7 | 9 |
| Data2 | 7 | 3 | 2 | 5 | 7 | 7 | 7 | 5 | 10 | 3 |
| COLLATION VALUE | 7 | 10 | 12 | 17 | 24 | 31 | 38 | 43 | 53 | 56 |

FIG.9

| ADR1 | 1 | 2 | 3 | 4 | 5 | 6 | 7 | 8 | 9 | 10 |
|---|---|---|---|---|---|---|---|---|---|---|
| Data1 | 5,7 | 7,2 | 2,1 | 1,7 | 7,5 | 5,10 | 10,5 | 5,3 | 3,4 | 4,5 |
| ADR2 | 3 | 7 | 2 | 10 | 3 | 1 | 2 | 6 | 10 | 1 |
| Data2 | 2 | 10 | 7 | 4 | 2 | 5 | 7 | 5 | 4 | 5 |
| COLLATION VALUE | 2 | 12 | 19 | 23 | 25 | 30 | 37 | 42 | 46 | 51 |

US 7,216,239 B2

COUNTERFEIT DETECTING PROGRAM, METHOD, AND APPARATUS OF DIGITAL DATA

BACKGROUND OF THE INVENTION

1. Field of the Invention

The present invention relates to techniques which can simply and highly accurately detect a counterfeit of a digital data.

2. Description of the Related Art

In recent automotive vehicles, in-vehicle control units perform electronic controls of an engine, a brake system, and various vehicular components. In the engine control, in order to cope with a compatibility of both an engine output and an exhaust quality, optimum control data obtained through various experiments are used. On the other hand, in part of automotive markets, an illegal modification on the control unit such that optimally set control data are rewritten in order to improve only the engine output without a reduction in the exhaust quality taken into consideration has been made. To cope with such an illegal modification as described above, in a North America, an automotive manufacturer is obliged to output a CVN (Calibration Verification Number) to a terminal in order to prevent the illegal modification of the control unit as a series of exhaust gas limitation reinforcements.

SUMMARY OF THE INVENTION

Hence, conventionally, a check sum of a program (including control data) is outputted as CVN. However, the following inconveniences occur. That is to say, the check sum is a total sum of simple additions of program data. Hence, if the additions or subtractions are canceled by dummy data, a program counterfeit is possible without change in CVN. Therefore, the check sum method cannot highly accurately detect the program counterfeit. In addition to the check sum method, a parity check method as disclosed in a Japanese Patent Application First Publication No. Heisei 8-137762 published on May 31, 1996 has been proposed. However, it is difficult to detect simply and highly accurately the program counterfeit even in the case of the parity check method.

It is, hence, an object of the present invention to provide a digital data counterfeit detection technique which can detect simply and highly accurately the counterfeit of the digital data by converting the digital data value into an address value and by executing a predetermined calculation for the digital data value stored in the converted address.

The above-described object can be achieved by providing a digital data counterfeit detecting program comprising: an address arithmetic processing function to perform an address arithmetic processing for a value of one of a plurality of digital data which is stored in each of addresses, a result of the address arithmetic processing performed for the value of the one of the digital data representing one of the addresses; and a collation value calculating function to execute a predetermined arithmetic processing for the value stored in each of the addresses which are the respective results of the address arithmetic processing performed by the address arithmetic processing function to calculate a collation value used for a digital data counterfeit detection.

The above-described object can also be achieved by providing a digital data counterfeit detecting program product including a computer usable medium having a digital data counterfeit detecting program logic recorded therein, the digital data counterfeit detecting program logic comprising: an address arithmetic processing function to perform an address arithmetic processing for a value of one of a plurality of digital data which is stored in each of addresses, a result of the address arithmetic processing performed for the value of the one of the digital data representing one of the addresses; and a collation value calculating function to execute a predetermined arithmetic processing for the value stored in each of the addresses which are the respective results of the arithmetic processing performed by the address arithmetic processing function to calculate a collation value used for a digital data counterfeit detection.

The above-described object can also be achieved by providing a digital data counterfeit detecting method comprising: performing an address arithmetic processing for a value of one of a plurality of digital data which is stored in each of addresses, a result of the address arithmetic processing performed for the value of the one of the digital data representing one of the addresses; and executing a predetermined arithmetic processing for the value stored in each of the addresses which are the respective results of the address arithmetic processing performed during performing the address arithmetic processing to calculate a collation value used for a digital data counterfeit detection.

The above-described object can also be achieved by providing digital data counterfeit detecting apparatus comprising: an address arithmetic processing section that performs an address arithmetic processing for a value of one of a plurality of digital data which is stored in each of addresses, a result of the address arithmetic processing performed for the value of the one of the digital data representing one of the addresses; and a collation value calculating section that executes a predetermined arithmetic processing for the value stored in each of the addresses which are the respective results of the arithmetic processing performed by the address arithmetic processing section to calculate a collation value used for a digital data counterfeit detection.

This summary of the invention does not necessarily describe all necessary features so that the invention may also be a sub-combination of these described features.

BRIEF DESCRIPTION OF THE DRAWINGS

FIG. 3 is an explanatory view of a content of a memory unit for explaining an example of a digital data to be an object of a detection by the digital data counterfeit detecting apparatus shown in FIG. 1.

FIG. 4 is an explanatory view of the content of the memory unit of for explaining the first embodiment of the digital data counterfeit detecting apparatus executing a collation value arithmetic processing.

Figure 5:
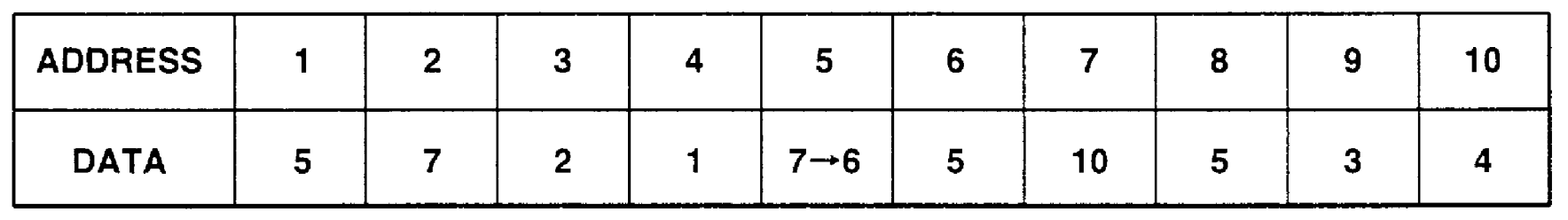

FIG. 5 is an explanatory view of the content of the memory unit representing an example of a counterfeit of the digital data.

FIG. 6 is an explanatory view of the content of the memory unit for explaining a collation value arithmetic processing in the case of the first embodiment of the digital data counterfeit detecting apparatus shown in FIG. 1 for the counterfeited digital data.

FIG. 7 is an explanatory view of the content of the memory unit for explaining the collation value arithmetic processing executed by the digital data counterfeit detecting apparatus in a second preferred embodiment according to the present invention.

FIG. 8 is an explanatory view of the content of the memory unit for explaining the collation value arithmetic processing executed by the digital data counterfeit detecting apparatus in a third preferred embodiment according to the present invention.

FIG. 9 is an explanatory view of the content of the memory unit for explaining the collation value arithmetic processing executed by the digital data counterfeit detecting apparatus in a fourth preferred embodiment according to the present invention.

DETAILED DESCRIPTION OF THE PREFERRED EMBODIMENTS

Reference will hereinafter be made to the drawings in order to facilitate a better understanding of the present invention.

Figure 1:
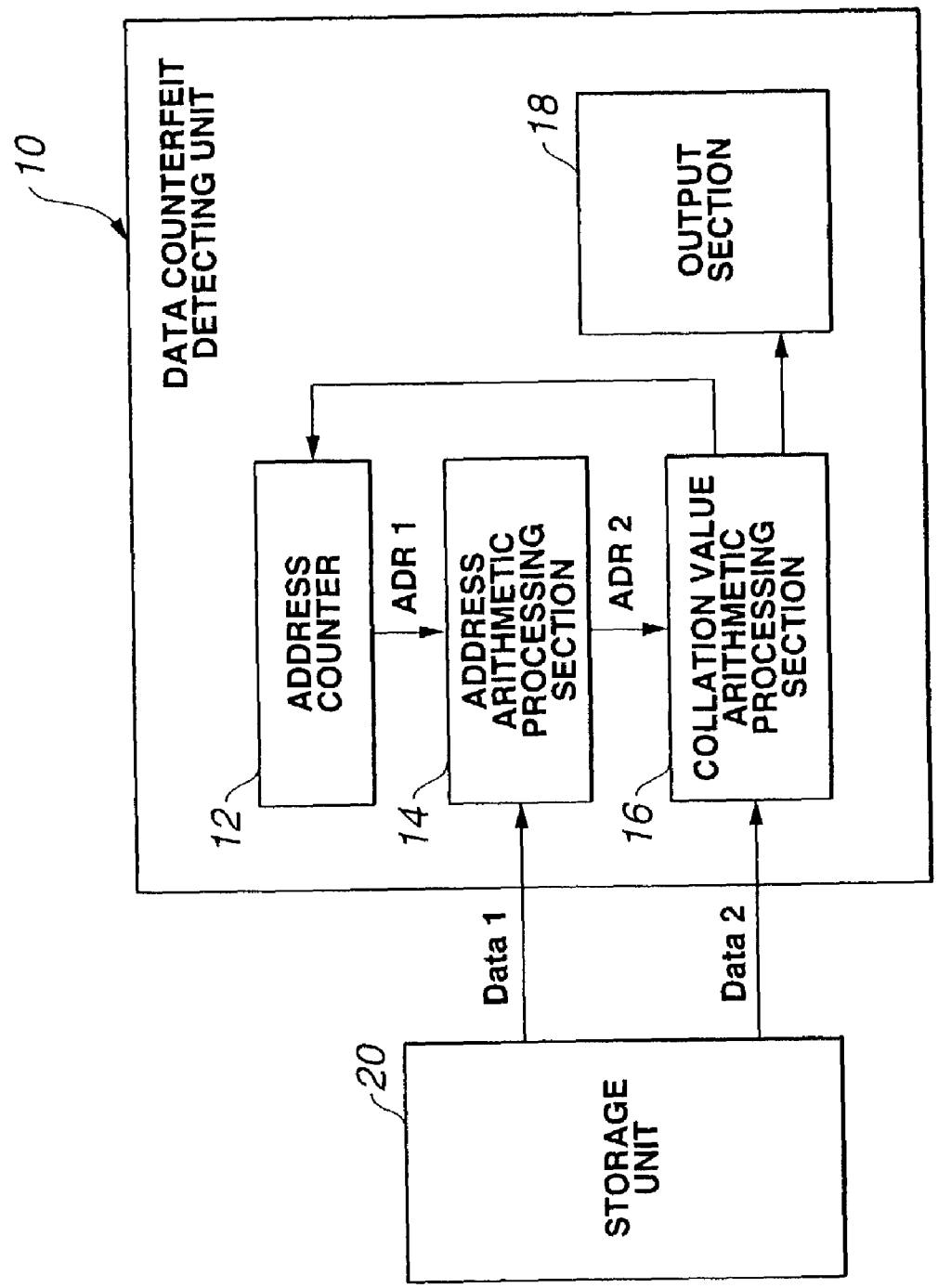
FIG. 1 is a structural functional block diagram of a computer system to which a digital data counterfeit detecting apparatus in a first preferred embodiment according to the present invention is applicable.

FIG. 1 shows a system configuration view of a computer system to which a digital data counterfeit detecting apparatus (hereinafter, referred also simply to as a counterfeit detecting apparatus) according to the present invention is applicable. A counterfeit detecting unit 10 is constructed on a computer having at least CPU (Central Processing Unit) and a memory and each of various functions by means of a program loaded onto a memory can be achieved.

Counterfeit detecting unit 10 includes an address counter 12, an address arithmetic processing (calculating) section 14, and a collation value calculation (arithmetic processing) section 16, and an output section 18. The digital data which is an object to be detected by means of counterfeit detecting unit 10 is stored into a memory unit (or storage unit) 20 such as a hard-disc, ROM (Read Only Memory), CD(Compact Disc)-ROM, and DVD(Digital Versatile Disc)-ROM. The digital data includes, for example, a computer program, control programs, and control maps used for respective kinds of automotive vehicles, and digital writings.

An address counter 12 represents an address ADR1 of the digital data in a memory unit 20. When a counterfeit detecting program of the digital data is started, an address counter 12 indicates a head address of the digital data to be the object to be detected for the counterfeit. Along with the process advance, the address is sequentially counted up (incremented). Suppose a case where a plurality of digital data are stored in memory unit 20. It is desirable that any one of the digital data can be selected from among the stored plurality of digital data. In this case, address counter 12 indicates the head address of the table data selected and specified. It is noted that the term of calculation has the same meaning of the term of arithmetic processing in this specification.

An address arithmetic processing section 14 reads a digital data Data1 stored into address ADR1 from memory unit 20 (Data1=(ADR1) ) on the basis of address ADR1 indicated by address counter 12. Then, address arithmetic processing section 14 executes a predetermined arithmetic process such as one of four rules of arithmetic and logic operation fundamentals for read digital data Data1 so that another digital data address ADR2 of the digital data which is a reference to perform the collation value for counterfeit detection is calculated. It is noted that address arithmetic processing section 14 constitutes address arithmetic processing function, address arithmetic processing step, and address arithmetic processing means.

A collation value arithmetic processing section 16 reads digital data Data2 stored in address ADR2 from memory unit 20 on the basis of address ADR2 calculated by address arithmetic processing section 14. Then, a predetermined calculation on an accumulation of numerical data is executed for read digital data Data2 to calculate a collation value used for the counterfeit detection. It is noted that the collation value arithmetic processing section 16 constitutes a collation value calculating function, a collation value calculating step, and collation value calculating means.

An output section 18 is constituted by a CRT (Cathode Ray Tube) and LCD (Liquid Crystal Display) or by a display device or printing device such as a printer to output visually the collation value calculated by collation value arithmetic processing section 16. It is desirable that output section 18 also outputs the collation reference value (the collation value in a case where no counterfeit is present) of the digital data to be the object of the counterfeit detection together with the collation value. Output section 18 constitutes a counterfeit output function, a counterfeit output step, and counterfeit output means.

Figure 2:
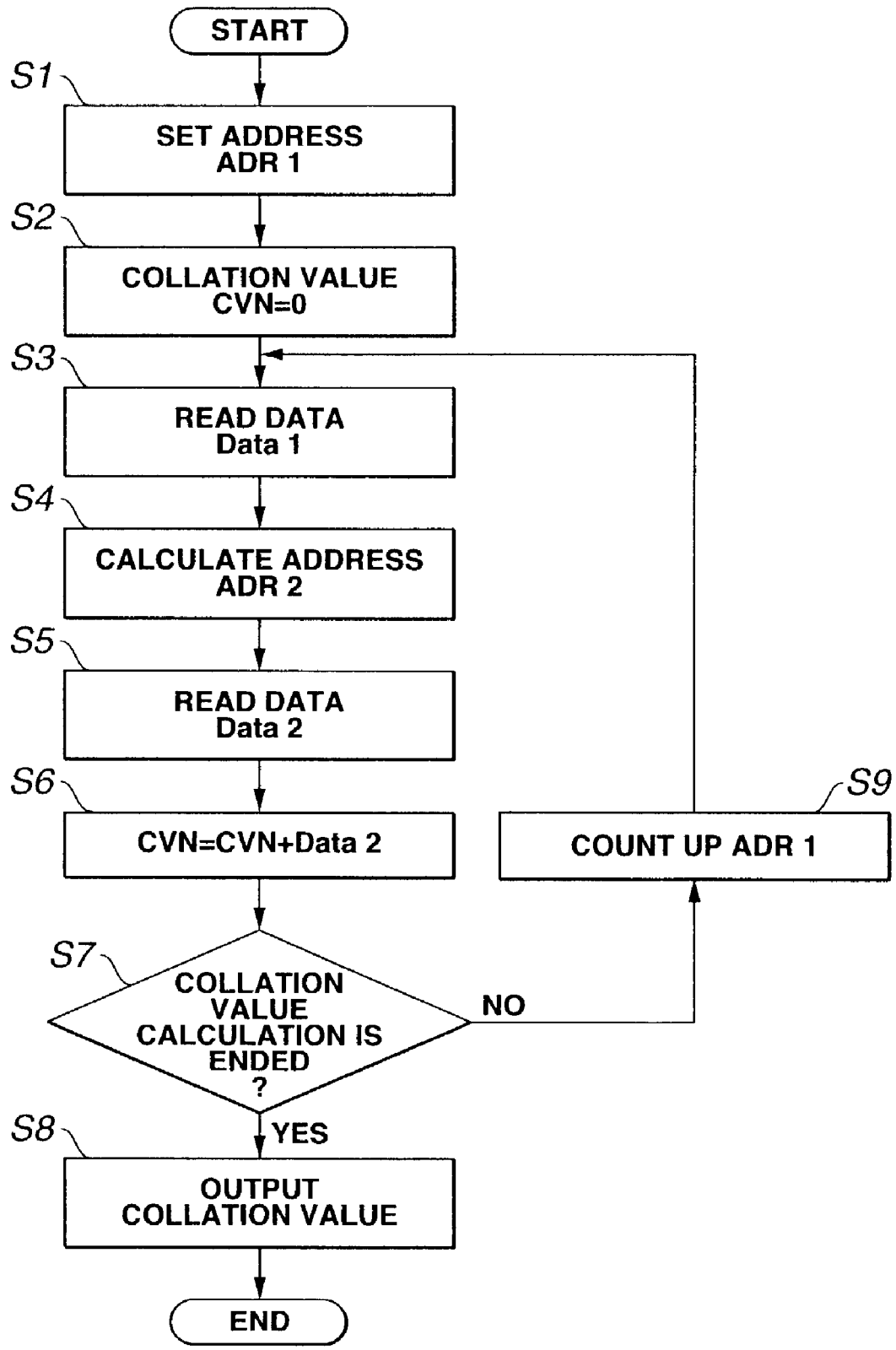
FIG. 2 is an operational flowchart representing the content of processing of the digital data counterfeit detecting apparatus shown in FIG. 1.

Next, an action of counterfeit detecting unit 10 will be described with reference to the flowchart in FIG. 2.

At a step S1, head (start) address ADR1 of the digital data indicated by address counter 12 is set. That is to say, in a case where the digital data is selected and specified by a user, the head address of the digital data selected in memory unit 20 is set as address ADR1. On the other hand, in a case where only one digital data is stored in memory unit 20, the head address of the memory unit 20 is set as address ADR1.

At a step S2, collation value CVN for the counterfeit detection is initialized to zero. At the next step S3, a digital data Data1 stored in address ADR1 is read from memory unit 20. At a step S4, a predetermined arithmetic process is executed for read digital data Data1 to calculate address ADR2 for the digital data which is the reference to calculate collation value CVN. It is noted that the predetermined arithmetic process includes such an arithmetic process that digital data Data1 serves directly as address ADR2 without change. It is also noted that steps S3 and S4 correspond to the address arithmetic processing function, the address arithmetic processing step, and the address arithmetic processing means.

At a step S5, digital data Data2 stored into address ADR2 is read from memory unit 20. At the next step S6, digital data Data2 is added to collation value CVN in order to calculate collation value CVN. It is noted that steps S5 and S6 correspond to the collation value calculating function, the collation value calculating step, and collation value calculating means.

At a step S7, computer system shown in FIG. 1 determines whether the arithmetic processing on collation value CVN is ended, namely, whether the process is ended to a final one of the digital data to be the object of the counterfeit detection. If the collation value arithmetic processing is ended (Yes), the routine shown in FIG. 2 goes to a step S8. At step S8, collation value CVN is outputted to output section 18. On the other hand, if the arithmetic processing is not ended (No), the routine goes to a step S9. At step S9, address ADR1 is counted up (incremented by one).

It is noted that, in place of the output of the collation value, when the collation value is not made coincident with the collation value reference value, the counterfeit of the digital data has been carried out and the effect of the above-described counterfeit may be outputted to output section 18. In this case, counterfeit determining process corresponds to a counterfeit determining function, counterfeit determining function, and counterfeit occurrence determining means.

Figure 3:
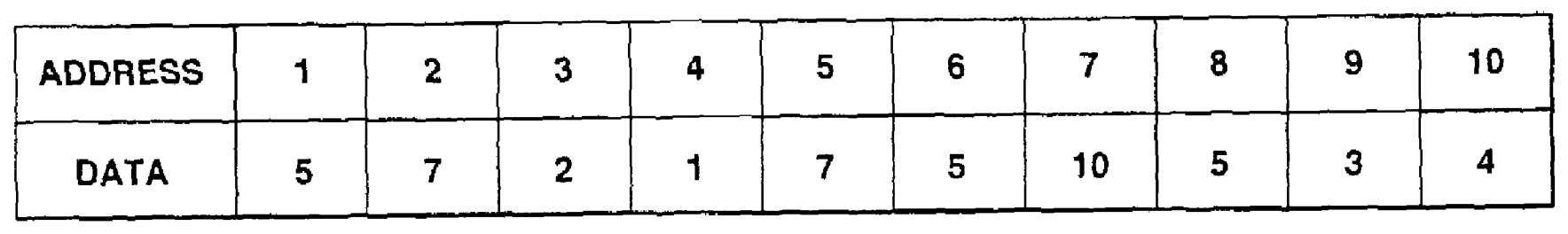

Next, using the digital data shown in FIG. 3, how arithmetic process for the collation value on the counterfeit detection is executed in counterfeit detecting unit 10. It is noted that, at an initial state of counterfeit detecting unit 10, 1 is set to address ADR1 indicated by address counter 12.

(First Embodiment)

In the first embodiment of the digital data counterfeit detecting apparatus shown in FIG. 1, as shown in FIG. 4, with digital data Data1 stored in address ADR1 as an absolute address, collation value CVN is calculated by means of digital data Data2. That is to say, if address ADR1=1, digital data stored in address 1 is read. The read digital data provides digital data Data1 (5). Since digital data Data1 which provides a reference for calculating the collation value for the counterfeit detection (hereinafter, referred to as a reference data) indicates an absolute address ADR2. Hence, the digital data stored in address 5 is read. This read digital data provides digital data Data2 (7). Then, digital data Data2 is added to collation value CVN(0) so that the present collation value CVN indicates "17".

When the above-described processing is sequentially repeated, collation value CVN finally indicates "60". Then, a comparison of collation value CVN with collation reference value serves to determine whether digital data has been counterfeited. A change of the collation value due to the counterfeit of the digital data in address 5 is rewritten from "7" to "6". If address ADR1=1, the digital data stored in address 1 is read as shown in FIG. 6 and this read digital data is digital data Data1 (5). Since digital data Data1 indicates an absolute address ADR2 of the reference data, the digital data stored in address 5 is read. This read digital data provides digital data Data2 (6). Digital data Data2 is added to collation value CVN(0). Collation value CVN indicates "6". If such a process as described above is repeated up to the last of the digital data, collation value CVN indicates "52". Hence, collation value CVN is different from collation reference value (60). Consequently, the counterfeit of the digital data can be detected.

In order for the counterfeit of the digital data not to be detected, it is necessary to rewrite any of the digital data other than the content of address 5 to make coincident with the collation reference value in order to make collation value CVN equal to collation reference value.

When the digital data stored in address 5 is used as absolute address ADR2 of reference data, it is necessary to rewrite digital data in address 6 since the reference data is naturally "7". However, in the example shown in FIG. 6, if address ADR1=5, the digital data stored in address 6 is used as the reference data. Therefore, it is necessary to further rewrite the digital data in any other addresses than addresses 5 and 6. Then, if the digital data in any other addresses is rewritten, this rewrite causes the necessity in further rewriting of any other addresses.

Hence, it is necessary to rewrite the values of the digital data over the whole area of the digital data in order to prevent a rewrite of part of the digital data from being detected. If the values of the whole area of the digital data are rewritten, the digital data itself becomes meaningless. The purpose of the rewrite cannot be achieved. The counterfeit thereof becomes extremely difficult.

(Second Embodiment)

In the second embodiment, as shown in FIG. 7, with digital data Data1 stored in address ADR1 as a relative address, an absolute address ADR2 to address ADR1 is determined, and collation value CVN is calculated in accordance with digital data Data2 stored therein.

In details, when address ADR1=1, the digital data stored in address 1 is read which serves as digital data Data1 (5). Digital data Data1 represents the relative address to address ADR1(1). Hence, an address arithmetic processing for address ADR1 calculates an absolute address ADR2(6) of the reference data is calculated, the digital data stored in address 6 is read, the read digital data providing digital data Data2 (5).

Then, digital data Data2 is added to collation value CVN(0) and the collation value CVN indicates "5". If this process is sequentially processed, the collation value of the digital data indicates "56".

(Third Embodiment)

In a third preferred embodiment, with a sum of digital data Data1 stored in address ADR1 and its continuing addresses as an absolute address ADR2, collation value CVN is calculated as digital data Data2 stored therein.

That is to say, when address ADR1=1, digital data stored in addresses 1 and 2 are read. This provides digital data Data1 (5, 7). A sum of digital data Data1 represents an absolute address of the reference data. The digital data stored in address 2 is read. This read data provides digital data Data2(7). Although the sum of digital data Data1 is 5+7=12, address 12 represents out of a range of digital data. Hence, in order for address 12 to be indicated within the digital data, for example, a modulus arithmetic processing is used to adjust address indicating 2. This is the same when the value of digital data falls out of range. Then, digital data Data2 is added to collation value (0) so that collation value CVN indicates "7". When address ADR1=2, digital data stored in addresses 2 and 3 are read. The read digital data Data1 represents an absolute address ADR2 of reference data. The digital data stored in addresses 9 (7+2) are read. This read address provide digital data Data2(3). Digital data Data2 for collation value (7) is added to collation value (7). Consequently, collation value CVN indicates "10".

Since such a process as described above is sequentially repeated, collation value CVN of digital data indicates "56".

(Fourth Embodiment)

In a fourth preferred embodiment of the digital data counterfeit detecting apparatus, as shown in FIG. 9, with a difference between address ADR1 and digital data Data1 stored in its continued (adjacent) address as a relative address, an absolute address to address ADR1 is derived so that digital data Data2 stored therein calculates collation value CVN.

In details, when address ADR1=1, digital data stored in addresses 1 and 2 are read. This read digital data provides digital data Data1 (5, 7). A difference between digital data Data1 (7−5=2) represents a relative address to address ADR1(1). Hence, since the relative address to address ADR1(1) is indicated by the above-described difference, the address arithmetic processing to address ADR1 causes absolute address ADR2(3) of the reference data to be calculated. If absolute address of reference data ADR2 is calculated, digital data stored in address 3 is read. This read digital data provides digital data Data2. Then, collation value CVN(0) is added to digital data Data2. Collation value CVN indicates "2". Since such a processing as described above is sequentially repeated, collation value CVN of digital data indicates "51". Hence, in counterfeit detection technology according to the present invention, even if part of digital data is rewritten, its influence extends over the whole digital data. Hence, the detection of the rewrite of the digital data is highly accurately carried out. In this case, collation value of the digital data is determined on the basis of the value stored in address calculated from digital data. Hence, although the address arithmetic processing is extremely simple, it is difficult to analyze its address arithmetic processing. Hence, even if a person who has counterfeited the digital data with an evil intention tries to conceal a counterfeit fact, an extremely large labor required to a conduct thereof is not only needed but also the digital data itself becomes meaningless. Digital data counterfeit detecting apparatus according to the present invention is usable for, for example, the counterfeit of a computer program.

It is noted that, in a case where the data counterfeit in a control unit of an automotive vehicle is detected, counterfeit detecting unit 10 according to the present invention is architected on the control unit and may be self-diagnosed. Then, if the counterfeit of the digital data on the control unit is detected, for example, a warning lamp attached onto a dash-panel may be illuminated or the vehicular engine may be controlled to be locked to disable its start. As described above, an illegal modification such as to lower an exhaust property of the automotive vehicle can effectively be prevented from occurring.

A program to achieve such series of functions as described above is recorded onto a computer readable recording medium such as a magnetic tape, a magnetic disc, a magnetic drum, an IC (Integrated Circuit) card, CD-ROM, and DVD-ROM. The digital data counterfeit program according to the present invention can be put circulatively into a market. Then, the person who acquires such a recording medium can easily be structured utilizing a general-purpose computer.

In addition, if the counterfeit detection program according to the present invention is registered onto a server connected to an internet, the digital data counterfeit program is downloaded via an electric communication circuit so that the digital data counterfeit detecting apparatus according to the present invention can easily be structured.

The entire contents of Japanese Patent Application No. 2001-246256 (filed in Japan on Aug. 14, 2001) are herein incorporated by reference. Various modifications and variations can be made without departing from the spirit of the present invention. The scope of the invention is defined with reference to the following claims.

What is claimed is:

1. A computer readable medium having program code recorded therein that, when executed on a computer, provides a digital data counterfeit detecting function, the program code comprising:

code for an address arithmetic processing function that performs an address arithmetic processing for a value of one of a plurality of digital data which is stored in each of addresses, a result of the address arithmetic processing performed for the value of the one of the digital data representing one of the addresses; and code for a collation value calculating function that executes a predetermined arithmetic processing for the value stored in each of the addresses which are the respective results of the address arithmetic processing performed by the address arithmetic processing function to calculate a collation value used for a digital data counterfeit detection.

2. A computer readable medium having program code recorded therein that, when executed on a computer, provides a digital data counterfeit detecting function as claimed in claim 1, wherein the code for the address arithmetic processing function converts the value of the one of the digital data stored in each of the addresses into the one of the addresses in which a corresponding one of the digital data is stored.

3. A computer readable medium having program code recorded therein that, when executed on a computer, provides a digital data counterfeit detecting function as claimed in claim 1, wherein the code for the address arithmetic processing function executes at least one of four rules of arithmetic operations for a plurality of values stored in at least one of the addresses surrounding each one of the addresses and in the each one of the addresses itself, a result of the one of the four rules of the arithmetic operations for the plurality of values representing one of the addresses of the digital data.

4. A computer readable medium having program code recorded therein that, when executed on a computer, provides a digital data counterfeit detecting function as claimed in claim 1, wherein the code for the collation value calculating function calculates the collation value used for the counterfeit detection, the address which is the result of the address arithmetic processing performed by the code for the address arithmetic processing function representing an absolute address of the corresponding one of the digital data.

5. A computer readable medium having program code recorded therein that, when executed on a computer, provides a digital data counterfeit detecting function as claimed in claim 1, wherein the code for the collation value calculating function calculates the collation value used for the counterfeit detection, the address which is the result of the address arithmetic processing performed by the code for the address arithmetic processing function representing a relative address of the corresponding one of the digital data.

6. A computer readable medium having program code recorded therein that, when executed on a computer, provides a digital data counterfeit detecting function as claimed in claim 1, wherein digital data counterfeit detecting program logic further comprises code for a counterfeit occurrence determining function to determine whether a counterfeit of at least one of the digital data has been carried out on the basis of the collation value calculated by the collation value calculating function.

7. A computer readable medium having program code recorded therein that, when executed on a computer, provides a digital data counterfeit detecting function as claimed in claim 6, wherein the digital data counterfeit detecting program logic further comprises code for a counterfeit output function to output a message to the effect that the counterfeit of the digital data has been carried out when the counterfeit occurrence determining function determines that the counterfeit of the digital data has been carried out.

8. A computer readable medium having program code recorded therein that, when executed on a computer, provides a digital data counterfeit detecting function as claimed in claim 3, wherein the code for the address arithmetic processing function executes a mutual addition for two values stored in the one of the addresses adjacent to each one of the addresses and each one of the addresses itself.

9. A computer readable medium having program code recorded therein that, when executed on a computer, provides a digital data counterfeit detecting function as claimed in claim 3, wherein the code for the address arithmetic processing function executes a mutual subtraction for two values stored in the one of the addresses adjacent to each one of the addresses and each one of the addresses itself.

10. A computer readable medium having program code recorded therein that, when executed on a computer, provides a digital data counterfeit detecting function as claimed in claim 1, wherein the code for the collation value calculating function calculates the collation value of the whole address sequentially from a head address to a last address as follows: CVN=CVN+Data2, wherein CVN denotes the collation value and indicates zero when initialized and Data2 denotes the value of the one of the digital data whose address is the result of the arithmetic processing performed by the code for the address arithmetic processing function for the value stored in the head address.

11. A computer readable medium having program code recorded therein that, when executed on a computer, provides a digital data counterfeit detecting function as claimed in claim 10, wherein the digital data counterfeit detecting program comprises code for a counterfeit occurrence determining function to compare the collation value with a reference collation value to determine whether the collation value is equal to the reference collation value to determine whether the counterfeit of the digital data has been carried out.

12. A digital data counterfeit detecting program product including a computer usable medium having a digital data counterfeit detecting program logic recorded therein, the digital data counterfeit detecting program logic comprising:
   an address arithmetic processing function to perform an address arithmetic processing for a value of one of a plurality of digital data which is stored in each of addresses, a result of the address arithmetic processing performed for the value of the one of the digital data representing one of the addresses; and
   a collation value calculating function to execute a predetermined arithmetic processing for the value stored in each of the addresses which are the respective results of the arithmetic processing performed by the address arithmetic processing function to calculate a collation value used for a digital data counterfeit detection.

13. A digital data counterfeit detecting program product as claimed in claim 12, wherein the address arithmetic processing function is to convert the value of the one of the digital data stored in each of the addresses into the one of the addresses in which a corresponding one of the digital data is stored.

14. A digital data counterfeit detecting program product as claimed in claim 12, wherein the address arithmetic processing function is to execute at least one of four rules of arithmetic operations for a plurality of values stored in at least one of the addresses surrounding each one of the addresses and in the each one of the addresses itself, a result of the one of the four rules of the arithmetic operations for the plurality of values representing one of the addresses of the digital data.

15. A digital data counterfeit detecting program product as claimed in claim 12, wherein the collation value calculating function is to calculate the collation value used for the counterfeit detection, the address which is the result of the address arithmetic processing performed by the address arithmetic processing function representing an absolute address of the corresponding one of the digital data.

16. A digital data counterfeit detecting program product as claimed in claim 12, wherein the collation value calculating function is to calculate the collation value used for the counterfeit detection, the address which is the result of the address arithmetic processing performed by the address arithmetic processing function representing a relative address of the corresponding one of the digital data.

17. A digital data counterfeit detecting program product as claimed in claim 12, wherein the digital data counterfeit detecting program logic further comprises a counterfeit occurrence determining function to determine whether a counterfeit of at least one of the digital data has been carried out on the basis of the collation value calculated by the collation value calculating function.

18. A digital data counterfeit detecting program product as claimed in claim 17, wherein the digital data counterfeit detecting program logic further comprises a counterfeit output function to output a message to the effect that the counterfeit of the digital data has been carried out when the counterfeit occurrence determining function determines that the counterfeit of the digital data has been carried out.

19. A digital data counterfeit detecting program product as claimed in claim 14, wherein the address arithmetic processing function is to execute a mutual addition for two values stored in the one of the addresses adjacent to each one of the addresses and each one of the addresses itself.

20. A digital data counterfeit detecting program product as claimed in claim 14, wherein the address arithmetic processing function is to execute a mutual subtraction for two values stored in the one of the addresses adjacent to each one of the addresses and each one of the addresses itself.

21. A digital data counterfeit detecting program product as claimed in claim 12, wherein the collation value calculating function calculates the collation value of the whole address sequentially from a head address to a last address as follows: CVN=CVN+Data2, wherein CVN denotes the collation value and indicates zero when initialized and Data2 denotes the value of the one of the digital data whose address is the result of the arithmetic processing performed by the address arithmetic processing function for the value stored in the head address.

22. A digital data counterfeit detecting program product as claimed in claim 21, wherein the digital data counterfeit detecting program logic comprises a counterfeit occurrence determining section to compare the collation value with a reference collation value to determine whether the collation value is equal to the reference collation value to determine whether the counterfeit of the digital data has been carried out.

23. A digital data counterfeit detecting method comprising:
   performing an address arithmetic processing for a value of one of a plurality of digital data which is stored in each of addresses, a result of the address arithmetic processing performed for the value of the one of the digital data representing one of the addresses; and
   executing a predetermined arithmetic processing for the value stored in each of the addresses which are the respective results of the address arithmetic processing performed during performing the address arithmetic processing to calculate a collation value used for a digital data counterfeit detection.

24. A digital data counterfeit detecting method as claimed in claim 23, wherein, when the address arithmetic processing is performed, the value of the one of the digital data stored in each of the addresses is converted into the one of the addresses in which a corresponding one of the digital data is stored.

25. A digital data counterfeit detecting method as claimed in claim 23, wherein, when the address arithmetic processing is performed, at least one of four rules of arithmetic operations is executed for a plurality of values stored in at least one of the addresses surrounding each one of the addresses and in the each one of the addresses itself, a result of the one of the four rules of the arithmetic operations for the plurality of values representing one of the addresses of the digital data.

26. A digital data counterfeit detecting method as claimed in claim 23, wherein, when the collation value used for the counterfeit detection is calculated, the address which is the result of the address arithmetic processing performed during the address arithmetic processing representing an absolute address of the corresponding one of the digital data.

27. A digital data counterfeit detecting method as claimed in claim 23, wherein, when the collation value used for the counterfeit detection is calculated, the address which is the result of the address arithmetic processing performed during the address arithmetic processing representing a relative address of the corresponding one of the digital data.

28. A digital data counterfeit detecting method as claimed in claim 23, wherein the digital data counterfeit detecting method further comprises determining whether a counterfeit of at least one of the digital data has been carried out on the basis of the collation value calculated during the collation value calculation.

29. A digital data counterfeit detecting method as claimed in claim 23, wherein the digital data counterfeit detecting method further comprises a counterfeit outputting to output a message to the effect that the counterfeit of the digital data has been carried out when determining that the counterfeit of the digital data has been carried out.

30. A digital data counterfeit detecting apparatus comprising:
    an address arithmetic processing section that performs an address arithmetic processing for a value of one of a plurality of digital data which is stored in each of addresses, a result of the address arithmetic processing performed for the value of the one of the digital data representing one of the addresses; and
    a collation value calculating section that executes a predetermined arithmetic processing for the value stored in each of the addresses which are the respective results of the arithmetic processing performed by the address arithmetic processing section to calculate a collation value used for a digital data counterfeit detection.

31. A digital data counterfeit detecting apparatus as claimed in claim 30, wherein the address arithmetic processing section converts the value of the one of the digital data stored in each of the addresses into the one of the addresses in which a corresponding one of the digital data is stored.

32. A digital data counterfeit detecting apparatus as claimed in claim 30, wherein the address arithmetic processing section executes at least one of four rules of arithmetic operations for a plurality of values stored in at least one of the addresses surrounding each one of the addresses and in the each one of the addresses itself, a result of the one of the four rules of the arithmetic operations for the plurality of values representing one of the addresses of the digital data.

33. A digital data counterfeit detecting apparatus as claimed in claim 30, wherein the collation value calculating section calculates the collation value used for the counterfeit detection, the address which is the result of the address arithmetic processing performed by the address arithmetic processing section representing an absolute address of the corresponding one of the digital data.

34. A digital data counterfeit detecting apparatus as claimed in claim 30, wherein the collation value calculating section calculates the collation value used for the counterfeit detection, the address which is the result of the address arithmetic processing performed by the address arithmetic processing section representing a relative address of the corresponding one of the digital data.

35. A digital data counterfeit detecting apparatus as claimed in claim 30, wherein the digital data counterfeit detecting apparatus further comprises a counterfeit occurrence determining section that determine whether a counterfeit of at least one of the digital data has been carried out on the basis of the collation value calculated by the collation value calculating section.

36. A digital data counterfeit detecting apparatus as claimed in claim 35, wherein the digital data counterfeit detecting apparatus further comprises a counterfeit output section to output a message to the effect that the counterfeit of the digital data has been carried out when the counterfeit occurrence determining section determines that the counterfeit of the digital data has been carried out.

37. A digital data counterfeit detecting apparatus comprising:
    address arithmetic processing means for performing an address arithmetic processing for a value of one of a plurality of digital data which is stored in each of addresses, a result of the address arithmetic processing performed for the value of the one of the digital data representing one of the addresses; and
    collation value calculating means for executing a predetermined arithmetic processing for the value stored in each of the addresses which are the respective results of the arithmetic processing performed by the address arithmetic processing means to calculate a collation value used for a digital data counterfeit detection.

* * * * *